Sept. 29, 1942.    H. H. HAMMERSTROM ET AL    2,296,849
CABINET FOR THE QUICK SPROUTING OF SOYBEANS FOR FOOD
Filed Aug. 28, 1941    2 Sheets-Sheet 1

HENRY H. HAMMERSTROM  Inventors
WARD B. DAVIS

By

Attorney

UNITED STATES PATENT OFFICE 2,296,849

CABINET FOR THE QUICK SPROUTING OF SOYBEANS FOR FOOD

Henry H. Hammerstrom, Los Angeles, and Ward B. Davis, Rosemead, Calif., assignors to Claude R. Wickard, as Secretary of Agriculture of the United States of America, and to his successors in office Application August 28, 1941, Serial No. 408,640

1 Claim. (Cl. 47—16)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a cabinet for sprouting soybeans and the like for food purposes. This cabinet is provided with apparatus for controlling the temperature and humidity, and with trays that are easily kept clean and sterile, for holding the sprouts as they develop. Not only is the rate of growth much faster by the use of this cabinet, but also it is possible to get a more nearly maximum yield and a more nearly uniform product than is usually obtained by the older method. In addition, there is less likelihood of browning of the sprouts.

An object of our invention is a new method for sprouting soybeans, mung beans and the like, for food, in a cabinet especially designed to control temperature and humidity.

Another object of our invention is a unique cabinet which controls temperature and humidity by the combined operation of a water-heating device, hot-water storage tank, equalizing tank, time clock, solenoid valve, thermostat, and sprinklers.

Still another object of our invention is a unique cabinet which includes a specially-designed tray for holding soybean sprouts in such a manner as to facilitate their growth, and also to facilitate emptying, cleaning and handling of the soybean sprouts.

Figure 1:
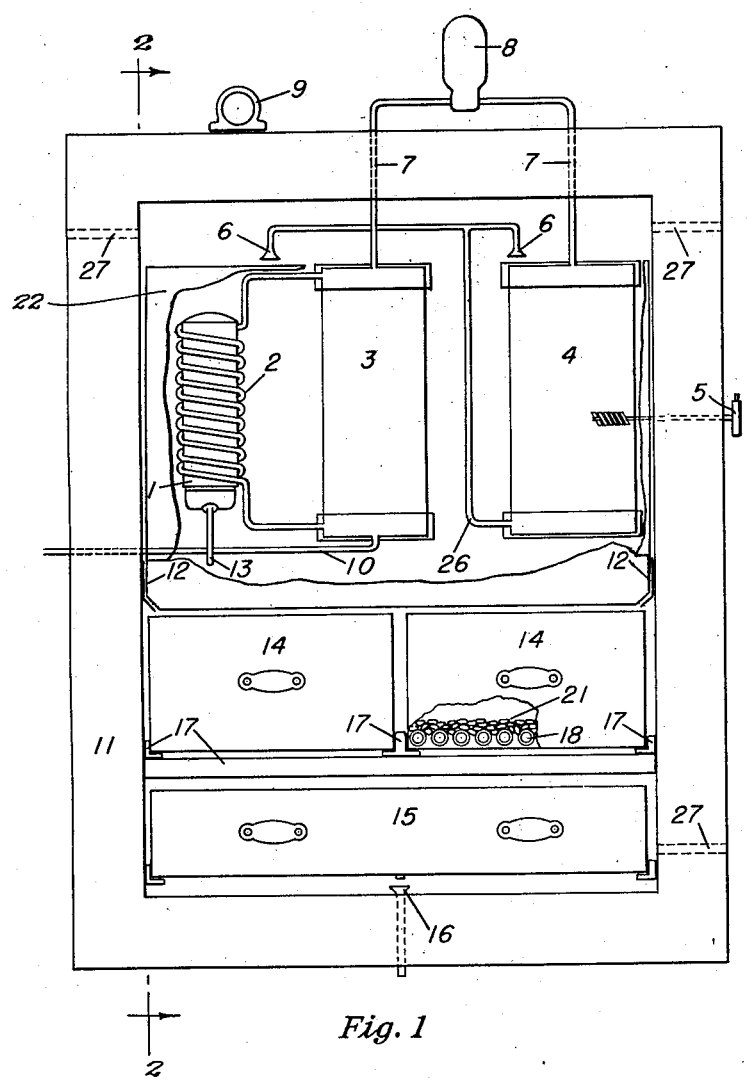
Figure 2:
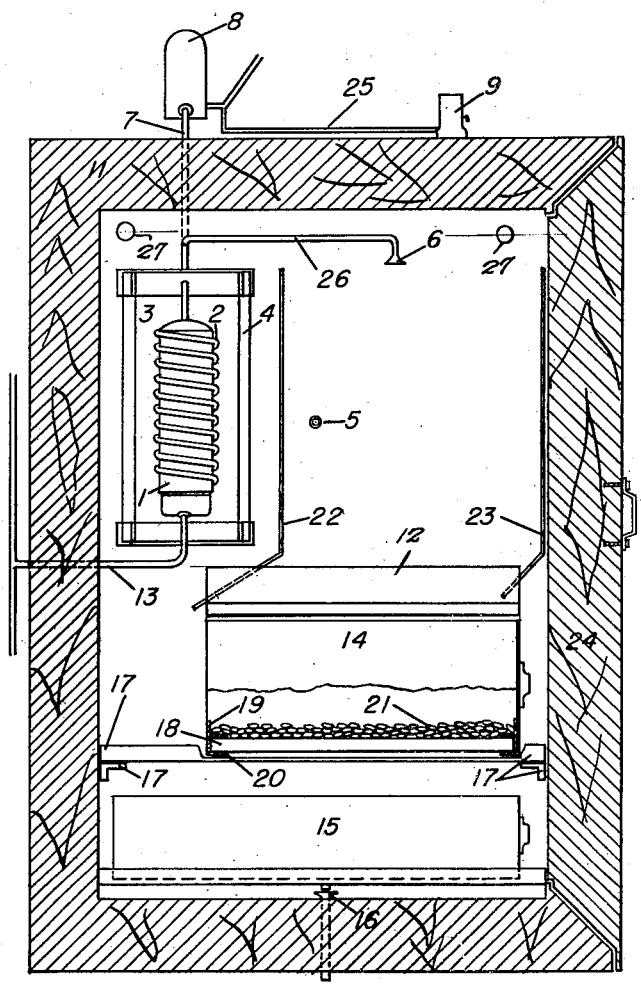

Our invention may be illustrated by the accompanying drawings in which Figure 1 is a front elevation showing the interior of the cabinet and Figure 2 is a sectional view taken on line 2—2, Figure 1 of our cabinet. Similar numerals refer to similar parts throughout the several views.

The cabinet is made preferably of wood. A few small holes 27 in the cabinet walls 11 should be sufficient for aeration. It is important that light be excluded, so as to avoid undesirable color development in the bean sprouts.

Referring to the drawings, it will be seen that two trays, made preferably of stainless steel and having bottoms formed by substantially ¼ inch non-corrosive rods or tubes 18, may be placed parallel lengthwise the tray.

The parallel rods or tubes are held from falling out by cross rods or flanges 19 at the ends of the trays. Rods 18 are placed together loosely enough to allow water to drain away but closely enough to retain the sprouts or seeds, and a certain quantity of water held by capillarity between them. This construction provides a tray which is easily emptied, cleaned and sterilized.

The temperature and humidity control in the cabinet is obtained by means of the combined operation of a water heater 1, hot-water storage tank 3, water temperature equalizing tank 4, sprinklers 6, and a thermostat 5. As the air temperature within the cabinet cools below that for which thermostat 5 is set, the thermostat closes the electrical circuit, not shown, and the water in coils 2 is heated by heater 1. The air temperature then rises until the desired temperature (80° to 90° F.) is reached, when thermostat 5 shuts off the current. Circulation of the heated air by convection is aided by baffle 22. At regular intervals, which are controlled by time-interval clock 9, solenoid valve 8 opens, and closes, and water from the bottom of the equalizing tank 4 is sprinkled on trays 14, containing sprouts 21. When water flows out of equalizing tank 4, which is at least twice the size of hot-water storage tank 3, a quantity of hot water equal to but a fraction of the capacity of equalizing tank 4 flows into the latter. This hot water mixes with the cooler water of equalizing tank 4. The temperature of the water gradually approaches the temperature of the air in the cabinet. The water from sprinklers 6 therefore does not cool the sprouts as in the old method, because its temperature is approximately at the air temperature in the cabinet. Quick growth of the sprouts results.

Below trays 14 is pan 15, which catches the water dripping from these trays. The water drains out of the cabinet through outlet 16. Plates 12 prevent water from running down the inside walls. Plate 23 prevents water from running down the cabinet door 24.

In the operation of our device, water from public service supply enters through pipe 10 and fills hot-water storage tank 3, copper tubing 2, and pipe 7. Timer 9 opens solenoid valve 8 electrically, and fills water temperature equalizing tank 4. When tank 4 is filled, the water passes through pipe 26 and through sprinklers 6, which spray beans 21 in tray 14. Water seeps between the beans, then between the rods or tubes 18, then into drip pan 15, and out through drain 16. The water is heated in copper coil 2, around electrical element 1, heating the water in tank 3.

The air is partly heated by direct heat from element 1 and the rest of the heat from the copper coil 2 and hot water storage tank 3. When the air has reached the correct temperature, the current is shut off by thermo-regulator 5. As the air is heated, it passes upward and over partition baffle 22, and then as it cools, it passes under this baffle, causing circulation of the air.

Timer 9 is constructed so that the periods of contact holding valve 8 open are short interval contacts each one-half hour, each hour, each one and one-half hours, or every two hours, or as otherwise may be needed. The short interval periods also may be varied as needed. Wires 25 connect timer 19 and electric valve 8. Thermo-regulator 5 is actuated by the change in temperature of the air in the cabinet, opening or closing the circuit to electric element 1.

Having thus described our invention, what we claim for Letters Patent is:

A cabinet, adapted for the purposes described, having vent holes, and comprising in combination an in-take water supply means, a hot-water storage tank connected to said in-take supply means, heating means connected to the storage tank, and equalizing tank adjacent the storage tank, a pipe connecting the tanks and adapted to carry hot water from the storage tank, a solenoid valve connected to said pipe, a time clock connected to the solenoid valve and mounted on the cabinet, a thermostat mounted near the equalizing tank, trays slidably mounted in the cabinet and below the heating means and tanks, a plurality of tubes adapted to form the bottoms of the trays, a drip pan slidably mounted in the cabinet and beneath the trays, a drain pipe connected to the drip pan, and means adapted for spraying water on the trays and connected to the equalizing tank.

HENRY H. HAMMERSTROM.
WARD B. DAVIS.